US010448114B2

(12) United States Patent
Koch et al.

(10) Patent No.: US 10,448,114 B2
(45) Date of Patent: Oct. 15, 2019

(54) METHOD AND SYSTEM FOR GENERATING A MEDIA CHANNEL ACCESS LIST

(71) Applicant: HD PLUS GmbH, Unterföhring (DE)

(72) Inventors: Matthias Koch, München (DE); Regina Brittner, Frankfurt am Main (DE); Sascha Strohmeier, Offenbach am Main (DE)

(73) Assignee: HD Plus GMBH, Unterfohring (DE)

(*) Notice: Subject to any disclaimer, the term of this patent is extended or adjusted under 35 U.S.C. 154(b) by 0 days.

(21) Appl. No.: 15/458,483

(22) Filed: Mar. 14, 2017

(65) Prior Publication Data

US 2017/0272826 A1 Sep. 21, 2017

(30) Foreign Application Priority Data

Mar. 17, 2016 (EP) .................................... 16160916

(51) Int. Cl.
  *H04N 5/445* (2011.01)
  *H04N 21/482* (2011.01)
  *H04N 21/45* (2011.01)

(52) U.S. Cl.
  CPC ..... *H04N 21/4825* (2013.01); *H04N 5/44543* (2013.01); *H04N 21/4532* (2013.01); *H04N 21/482* (2013.01); *H04N 2005/44556* (2013.01)

(58) Field of Classification Search
  CPC ............. H04N 21/4825; H04N 21/482; H04N 21/44543; H04N 21/4532; H04N 21/44556
  USPC ......................................................... 725/19
  See application file for complete search history.

(56) References Cited

U.S. PATENT DOCUMENTS

| 7,561,587 B2* | 7/2009 | Douglass | H04L 49/602 370/401 |
| 7,761,330 B2* | 7/2010 | Yoshimine | G06Q 20/10 705/14.49 |
| 7,908,635 B2* | 3/2011 | Barton | H04N 5/765 725/134 |
| 8,001,585 B2* | 8/2011 | Hogan | G06F 21/41 726/6 |
| 8,250,612 B2* | 8/2012 | Kim | H04N 21/2143 725/116 |
| 2002/0046097 A1* | 4/2002 | Yoshimine | G06Q 20/10 705/14.23 |
| 2003/0192061 A1* | 10/2003 | Hwangbo | H04N 5/40 725/138 |
| 2004/0073802 A1* | 4/2004 | Seol | G06F 21/31 713/183 |

(Continued)

FOREIGN PATENT DOCUMENTS

WO WO1996017473 A1 6/1996

OTHER PUBLICATIONS

Extended European Search Report for EP Application No. 16160916. 9, dated Aug. 11, 2016 (4 pages).

*Primary Examiner* — Michael B. Pierorazio
(74) *Attorney, Agent, or Firm* — Meyertons Hood Kivlin Kowert and Goetzel PC; Jeffrey C. Hood

(57) ABSTRACT

The present invention relates to a method and system for generating and/or modifying a media channel access list, comprising obtaining a channel list of a plurality of media channels, displaying a plurality of channel groups associated with the plurality of media channels, selecting one of the plurality of channel groups, and assigning at least one of the plurality of media channels of the selected channel group to the media channel access list.

20 Claims, 14 Drawing Sheets

(56) References Cited

U.S. PATENT DOCUMENTS

| | | | |
|---|---|---|---|
| 2005/0108519 A1* | 5/2005 | Barton | H04L 63/0823 713/155 |
| 2006/0161774 A1* | 7/2006 | Huh | G06F 21/445 713/168 |
| 2006/0190983 A1* | 8/2006 | Plourde, Jr. | G06F 17/30017 725/145 |
| 2006/0282869 A1* | 12/2006 | Plourde, Jr. | G06F 17/30017 725/115 |
| 2007/0157248 A1* | 7/2007 | Ellis | H04N 5/445 725/47 |
| 2007/0157281 A1* | 7/2007 | Ellis | H04N 7/17309 725/134 |
| 2008/0046953 A1* | 2/2008 | Kossila | G06Q 90/00 725/132 |
| 2009/0259640 A1* | 10/2009 | Bredikhin | G06F 17/30864 |
| 2009/0299543 A1* | 12/2009 | Cox | G06F 1/203 700/299 |
| 2009/0328167 A1* | 12/2009 | O'Mahony | H04L 63/08 726/6 |
| 2010/0011404 A1* | 1/2010 | Douillet | H04N 7/163 725/127 |
| 2010/0027441 A1* | 2/2010 | Curtis | H04W 12/02 370/254 |
| 2010/0122313 A1* | 5/2010 | Ivgi | G06F 21/6218 726/1 |
| 2010/0306805 A1* | 12/2010 | Neumeier | H04N 5/44591 725/60 |
| 2010/0306808 A1* | 12/2010 | Neumeier | H04N 5/44591 725/105 |
| 2011/0099373 A1* | 4/2011 | Woo | H04N 21/2143 713/168 |
| 2011/0099378 A1* | 4/2011 | Kim | H04N 21/2143 713/172 |
| 2011/0099575 A1* | 4/2011 | Woo | H04H 20/59 725/33 |
| 2011/0099578 A1* | 4/2011 | Kim | H04N 21/238 725/40 |
| 2011/0099583 A1* | 4/2011 | Shin | H04N 5/765 725/46 |
| 2011/0099589 A1* | 4/2011 | Woo | H04N 7/106 725/81 |
| 2011/0099590 A1* | 4/2011 | Kim | H04N 21/2143 725/81 |
| 2011/0145856 A1* | 6/2011 | Agarwal | G06Q 30/02 725/32 |
| 2011/0247031 A1* | 10/2011 | Jacoby | H04N 21/4351 725/25 |
| 2011/0265171 A1* | 10/2011 | Hogan | G06F 21/41 726/7 |
| 2012/0017256 A1* | 1/2012 | Yang | H04N 5/4403 725/151 |
| 2012/0079547 A1* | 3/2012 | Kim | H04N 21/43615 725/111 |
| 2013/0247115 A1* | 9/2013 | Minnick | H04N 5/782 725/68 |

* cited by examiner

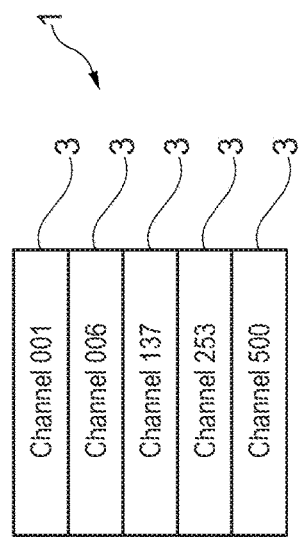
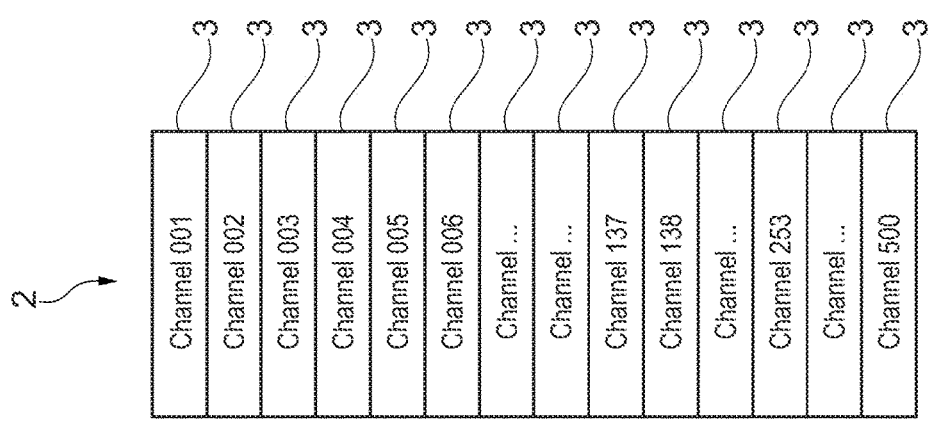
Fig. 1
Prior Art

METHOD AND SYSTEM FOR GENERATING A MEDIA CHANNEL ACCESS LIST

PRIORITY DATA

This application claims benefit of EP Patent Application No. 16 160 91609, titled "Method and System for Generating a Media Channel Access List" filed Mar. 17, 2016, whose inventors are Matthias Koch, Regina Brittner, and Sascha Strohmeier.

TECHNICAL FIELD

The present invention relates to a method and system for generating and/or modifying a media channel access list.

PRIOR ART

With the introduction of television systems, radio broadcasting, and streaming services the amount of media channels, such as TV channels, radio channels, video on demand services and the like has significantly increased over time. This applies to all kinds of media transmission types, such as terrestrial transmission, cable transmission, satellite transmission, packet-based and/or Internet-based transmission.

In view of the large selection of available media channels users of reception devices typically desire to organize the overall list of available media channels into a desired individual media channel access list, e.g. by sorting the overall list so that the most frequently used media channels appear on top by or generating a "favorites list" which comprises only the most frequently used media channels. Organizing the overall list of available media channels for reception devices such as television devices, radio devices, settop boxes, streaming clients, tablets, smartphones etc., or even for digital program guide services, for example provided in the Internet, however, is an extremely cumbersome process.

One possibility to organize the large amount of available media channels is to start from a complete media channel list which is typically created during the installation setup routine when the reception device scans for its available channels. Commonly, such an initial list comprises all available media channels sorted by name, by frequency, by a specific broadcasted signalization, or similar methods, thereby resulting in a channel sorting which is hardly useful. In order to generate an individual media channel access list, the complete media channel list has be modified, wherein media channels have to be selected and moved to the desired position or at least some media channels are even removed from the list. Alternatively, an individual media channel access list may be manually generated which exists besides the complete media channel list. In that case, the desired media channels of the complete media channel list have to be selected and copied to the individual media channel access list one by one.

The above methods are typically performed by means of an operation device, such as a remote control of the respective reception device, or a touchscreen of an associated tablet computer or smartphone. However, in both scenarios the operation device is heavily used in that a vast number of key presses on the remote control or a vast number of gestures on the touchscreen have to be performed in order to organize the channel list as desired.

This is not only inconvenient and time-intensive for the user, but also has a number of technical disadvantages. For example, the battery of the remote control is severely strained and in particular the durability of the remote control and its keys significantly suffers from the vast amount of necessary key presses. The same applies to the surface of a touchscreen which is even more sensitive than mechanical keys of a remote control. In addition, the content displayed on a respective display of the reception device does hardly change during the process of organizing the media channel access list. In such a case, individual pixels of the screen might get damaged when they have to display the non-changing content of, for example, a static non-animated media channel list editing menu.

Therefore, methods and systems have been developed relating to an optimized organization of media channels. For example, some manufacturers of reception devices provide a specific computer program that can be used for sorting media channels. Using this approach, the initial channel list of the reception device is typically transferred to an external device, such as a personal computer, where it can be sorted by utilizing the provided computer program, and is then transferred back to the reception device. While this approach somewhat improves usability due to the benefit of being able to use a mouse and keyboard, it is still inconvenient, since e.g. the list has to be transferred forth and back.

It is also known to provide the initial media channel list as a pre-sorted list compiled by the device manufacturer or platform operator to reflect the taste of an average consumer.

Furthermore, U.S. Pat. No. 7,603,685 B2 discloses an improved interactive television program guide system in which the program guide may provide the user with a selectable list of combination categories. Combination categories are composed of multiple single categories such as sports, news, comedy, movies, children, etc. Program listings, which may be displayed and searched according to programming categories, are supplied to the program guide. At least some of the program listings are associated with combination categories. A combination category build process may be used to assign combination categories to program listings. The user is able to use the selectable categories list to quickly identify programming of interest. WO 99/04560 discloses a TV graphical user interface (GUI) in a satellite TV system that enables users to create customized lists of TV channels. Everyday, favorite and theme lists may be generated to respectively combine TV channels being watched regularly, favorite TV channels and channels relating to particular subjects. An oval list name object is arranged on a screen to indicate the name of the currently selected list of TV channels. The users may click on the list name object to make their selection among various TV channel lists available in the TV system. In a channel changer mode, the TV GUI displays a graphical channel changer composed of channel boxes that show numbers and logos of TV channels in the currently selected list. To switch the TV set to a required TV channel, the user clicks on the graphical channel box that indicates the required channel. In a program guide mode, a list of TV programs may be provided based on the channel changer. Vertical program bars that display TV programs are aligned with the channel boxes indicating TV channels that carry the corresponding TV programs. To identify various TV channel lists available in the TV system, the oval list name object, as well as the channel boxes and program bars, are displayed in a color that represents a selected TV channel list. However, these approaches primarily deal with the organization of TV programs, i.e. individual TV shows that are broadcast on a specific channel at a specific time, and therefore do not help the user to organize a media channel list of his/her reception device.

In summary, none of the above described approaches known from the prior art is able to overcome the disadvantages explained further above, in particular the negative physical effects imposed on the operating device when organizing a media channel access list.

It is therefore the technical problem underlying the present invention to provide an improved method and system for organizing a media channel access list which reduces negative physical effects, such as wear, abrasion and/or a resulting malfunction of the involved physical devices, thereby at least partly overcoming the above explained disadvantages of the prior art.

SUMMARY OF INVENTION

The above mentioned problem is solved by the methods and systems defined in the independent claims. According to one aspect of the invention, a method for generating and/or modifying a media channel access list is provided. The method comprises (a) obtaining a channel list of a plurality of media channels, (b) displaying a plurality of channel groups associated with the plurality of media channels, (c) selecting one of the plurality of channel groups, and (d) assigning at least one of the plurality of media channels of the selected channel group to the media channel access list.

The initially obtained channel list preferably comprises all media channels available to a reception device and may be obtained by means of the reception device scanning the reception network. Media channels may comprise any kind of media such as television programs, radio broadcasts, internet streams, podcasts, bi-directional services such as Internet-based services etc.

Unlike in the prior art, where the user is faced with a huge list of available channels which he/she has to organize manually, the invention is based on the concept of displaying channel groups (which are preferably automatically generated) to the user, so that the user can select one of the groups and then assign one or more channels within the selected group to the media channel access list. This allows the user to navigate through the available channels with a significantly reduced amount of input operations on his/her operation device, which in turn significantly reduces the negative physical effects of said device, as will be further illustrated by way of an example in the detailed description further below.

In particular, the reduced number of necessary user inputs protects the keys of a remote control as well as the touchscreen of a tablet computer or smartphone used as operation device, against abrasion. In addition, the power consumption of the operation device is significantly reduced, since less key presses or touchscreen gestures are required. Moreover, the time for generating and/or modifying the media channel access list is also reduced. As a consequence, the time in which a media channel selection dialog is displayed on a corresponding display is reduced. It is known that pixels of a display may be damaged when they show the same color for a specific period of time without changes. Therefore, the above described method not only reduces the physical strain on the operation device, but also prevents damaging pixels of the display device by reducing the amount of time in which the display shows hardly changing content.

Each channel group may relate to a specific topic, such as sports, news, movies etc. and the media channels may be grouped accordingly. For example, a channel group may be labeled "sports" and thus, all sports-related media channels may be assigned to this group. For each topic like sports, weather, news, movies, TV shows, music and the like, one or more corresponding groups may exist. Grouping the available media channels by topics has the technical advantage that a user will likely find the desired media channel with a significantly reduced number of input operations, since he/she will intuitively navigate to the correct channel group in search for a specific channel, thereby improving the above explained technical advantages even more.

In a further aspect of the present invention, the above described step (d) may further comprise assigning at least two or all of the plurality of media channels of the selected channel group to the media channel access list in response to a user input, preferably in response to a single user input. Apparently, assigning two or a greater number of media channels at once to the media channel access list further reduces the amount of necessary input actions to organize the media channel access list and thereby further reduces the power consumption and improves the durability of the used operation device.

These positive physical effects are even more fully exploited when all media channels of a selected channel group are assigned to the media channel access list with just one single user input. For example, a user who is interested in media channels according to a specific topic, such as sports, may likely want to have more than one sports channel in his/her media channel access list. Assigning all media channels of the selected sports channel group to the media channel access list achieves this by means of only a single input operation on the operation device.

In yet another aspect of the present invention, the above described step (c) may further comprise assigning the at least one of the plurality of media channels of the selected channel group to the end of the media channel access list or to a specified position in the media channel access list. By simply assigning selected media channels to the end of the media channel access list or to a specified position, the number of user inputs required for specifically positioning the selected media channel in the media channel access list is further reduced.

As already explained above, step (c) and/or step (d) may be performed in response to user input on a remote control, a touchscreen, a voice recognition system and/or a gesture recognition system.

In a further aspect of the present invention, each of the plurality of media channels is associated with at least one of the plurality of channel groups. Providing the possibility to assign a media channel to more than one channel group may increase its findability. When, for example, a user browses through the channel groups he may find the desired media channel the faster the more channel groups the channel is assigned to. Therefore, both the time and the number of user inputs required for locating a desired media channel may be further reduced.

In yet another aspect of the present invention, step (c) may further comprise preselecting one of the plurality of channel groups and/or preselecting at least one of the plurality of media channels of the selected channel group. Such a preselecting may be based on one or more priorities provided by a remote device over a network. For example, a channel group that includes the most used media channels (for example according to centrally stored usage statistics) may be automatically preselected because it is highly likely that most users may want to assign a media channel of said group to the media channel access list. The priorities may be received from a remote device over a network, wherein the remote device may be a computer, a server or the like and wherein the network may be the Internet or any other communication network.

The selection of the channel group of step (c) and/or the assignment of the at least one media channel of the plurality of media channels of step (d) may be transmitted to a remote device over a network. When a user selects a specific channel group and/or a specific media channel, this may also be communicated to a remote device over the network. This may be the same remote device as discussed above or any other remote device. The remote device may gather information received from a plurality of users. Then, the remote device may determine the priorities corresponding to the channel groups and/or the media channels according to the number of how many users have selected said channel group and/or said media channel in a specific time period. In turn, the remote device may then transmit these priorities to a reception device.

This may further improve power consumption and durability of both displays and operation devices since a priority-based preselection approach may increase the probability that the desired channel group and/or the desired media channel(s) may already be preselected and therefore avoids any further user input regarding the selection.

A further aspect of the present invention relates to receiving and/or updating the plurality of media channels, the plurality of channel groups and/or the association of the plurality of media channels with at least one of the plurality of channel groups from a remote device over a network. Keeping the media channels, the channel groups, and their respective association up-to-date, these information may be updated regularly by a remote device, as already described above. Such an update may further improve power consumption and durability of both the operation devices and the involved displays because no further user input is required for manually searching new media channels or updating the channel groups including the corresponding association of the respective media channels.

In a further aspect of the present invention, at least some of the plurality of channel groups may comprise one or more subgroups and at least some of the plurality of media channels may be assigned to at least one of the plurality of channel groups and to one or more respective subgroups. Such subgroups may provide a further more fine-grained access layer between the channel groups and the respective channels. Thus, when searching for a specific media channel, at first the channel groups may be cycled through, followed by cycling through the subgroups. Then, the desired media channel may be selected and assigned to the media channel access list with a significantly reduced number or user inputs.

In a further aspect, the media channel access list is persistent. Making the media channel access list persistent may enable the method to reuse any existing media channel access list, for example, after rebooting a device holding the media channel access list.

The method according to the above-given description may be performed by the reception device which is also used for consuming the media channels, and/or by a device external to a media channel reception device. Accordingly, the media channel access list may be transferred to an external device for modification purposes. This may further enhance the flexibility of the above described method.

A further aspect of the present invention relates to a system for generating and/or modifying a media channel access list configured to perform any of the above described methods. The system may comprises at least one of the following devices: a television device, a settop-box device, a streaming client device, a tablet device, a smartphone device, a computer device, a remote control, a gesture recognition system, a voice recognition system, and/or a radio device. In particular, at least parts of the system may be implemented in terms of an application for smartphones and/or tablet devices, such as a TV guide app or the like.

Lastly, the present invention also provides a computer program comprising instructions for performing any of the above described methods.

SHORT DESCRIPTION OF THE DRAWINGS

In the following, embodiments of the present invention are explained in detail with respect to the figures, in which:

FIG. 1 shows a channel list and a media channel access list according to the prior art;

DETAILED DESCRIPTION OF PREFERRED EMBODIMENTS

Figure 2:
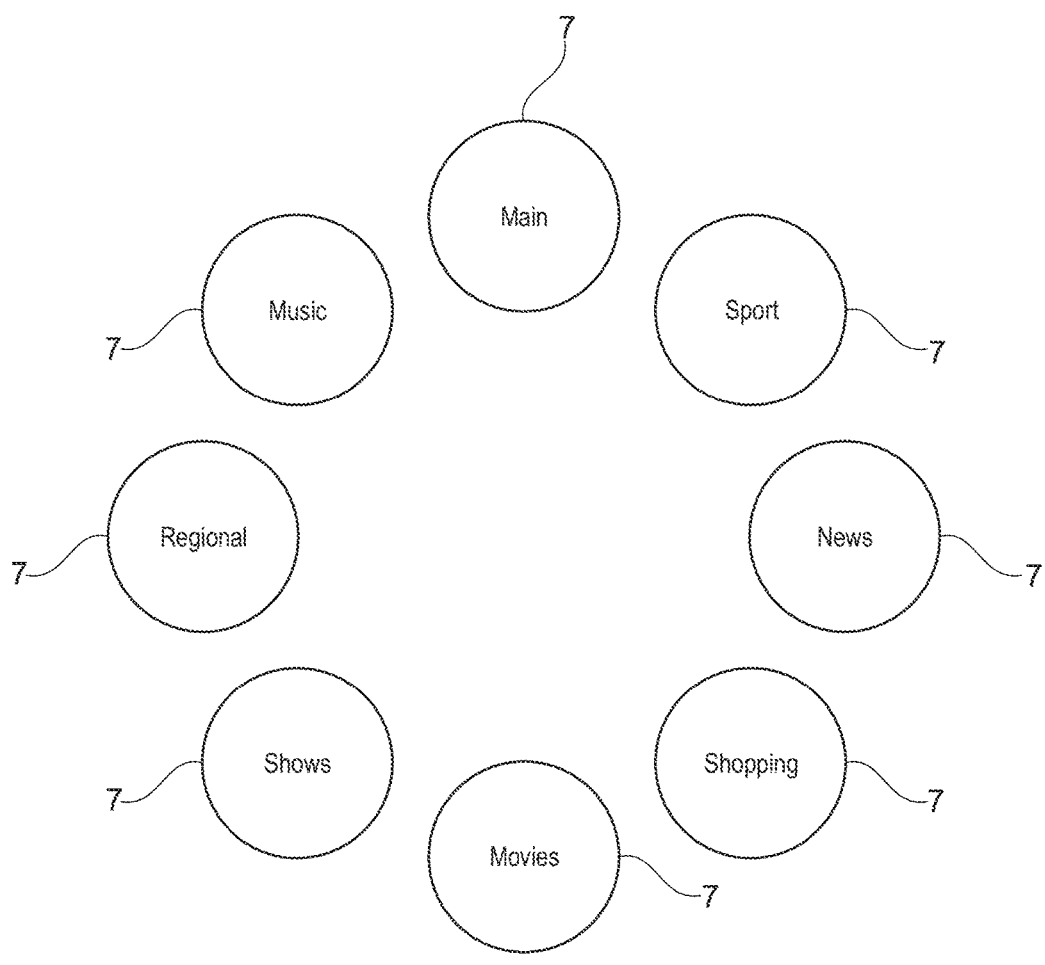
FIG. 2 shows a plurality of channel groups according to embodiments of the present invention.

In the following, embodiments and variations of the present invention are described in detail with respect to the figures.

FIG. 1 shows 500 exemplary media channels 3 organized in a channel list 2 as known from the prior art. The channel list 2 typically comprises all available media channels 3 of a reception device which have been identified during a scanning process. The media channels 3 in the channel list 2 may be sorted according to their name, frequency or by their broadcasting signalization, however, any other suitable sorting criterion is possible. Apparently, navigating through the complete channel list 2 of 500 channels 3 each time the user intends to switch channels is not convenient. Therefore, FIG. 1 also shows a media channel access list 1, which is a "favorites" list comprising only the five media channels 3 most frequently used by the user, namely in this example the channels "001", "006", "137", "253" and "500".

In the following, the process of generating the media channel access list 1 shown in FIG. 1 based on the overall channel list 2 will be explained on the one hand using the approaches known from the prior art and on the other hand using the present invention:

In the prior art approach which operates directly on the overall media channel list 2 and assuming that the first entry of the channel list 2 is preselected in each selection cycle, the user has to perform one user input on his operation device to assign "Channel 001" 3 to the media channel access list 1, e.g. by pressing an "OK"-button on the remote control. Thereafter, the user has to perform six user inputs on the operation device to assign "Channel 006" 3 to the media channel access list 1, namely five user inputs for scrolling down in the channel list 2 (e.g. by pressing a "DOWN"-button) and then one further user input for adding "Channel 006" 3 to the media channel access list 1 (e.g. by pressing the "OK"-button). In order to add "Channel 137" 3 to the media channel access list 1, 137 user inputs have to be performed. Then, 253 user inputs have to be performed to add "Channel 253" 3 to the media channel access list 1, and finally 500 additional user inputs to add "Channel 500".

In summary, the user has to perform a total of 897 user inputs to create the media channel access list 1 shown in FIG. 1. As is apparent from the above, this vast number of required input actions is mainly caused by the user having to scroll down numerous times in the overall channel list 2. Assuming that the user uses a remote control to do so, the "DOWN"-button of the remote control will have undergone severe strain and the button might even be damaged in the worst case. Even if it was assumed that the user can scroll down by pressing and holding the "DOWN"-button, the inventors have found that users tend to put considerable pressure on the button during such an input action, which equally strains the physical button. Apparently, a similar amount of touch gestures are necessary when a touch interface is used as operating device, which causes similar negative physical effects.

In the following, it will be shown that significantly less user inputs are needed to create the exemplary media channel access list 1 of FIG. 1 by using an embodiment the present invention as illustrated in FIGS. 2-5:

When a user begins generating and/or modifying the media channel access list 1, he is according to the invention presented with a plurality of channel groups 7 as shown in FIG. 2 instead of the large overall channel list 2 of FIG. 1. In the example of FIG. 2, the channel groups 7 are labelled "Main", "Sport", "News", "Shopping", "Movies", "Shows", "Regional" and "Music", while it should be understood that the present invention is susceptible to any other type of channel grouping.

Preferably, the device operating the method of embodiments of the invention also stored a pre-defined mapping of individual media channels 3 to channel groups 7. Accordingly, when the initial overall list of media channels 3 has been obtained, the corresponding channels 3 can be grouped according to the mapping in order to create the channel groups 7 of the invention.

In addition, a media channel 3 may be assigned to the respective channel group 7 and/or subgroup 9 manually. Nevertheless, also an automatic assignment may be possible by, for example, analyzing respective metadata of both the media channels 3 and the channel groups 7 and/or subgroups 9. The metadata may be gained from various sources, like directly from the media channel provider and/or from the electronic program guide (EPG) data, commonly provided together with the media channels 1. However, any other electronic source may also be suitable.

In the following, it is further assumed that the channel group "Main" is pre-selected in each selection cycle, that the channels "001" and "006" are sports channels that channel "137" is a news channel, and that channels "253" and "500" are shopping channels.

Figure 3:
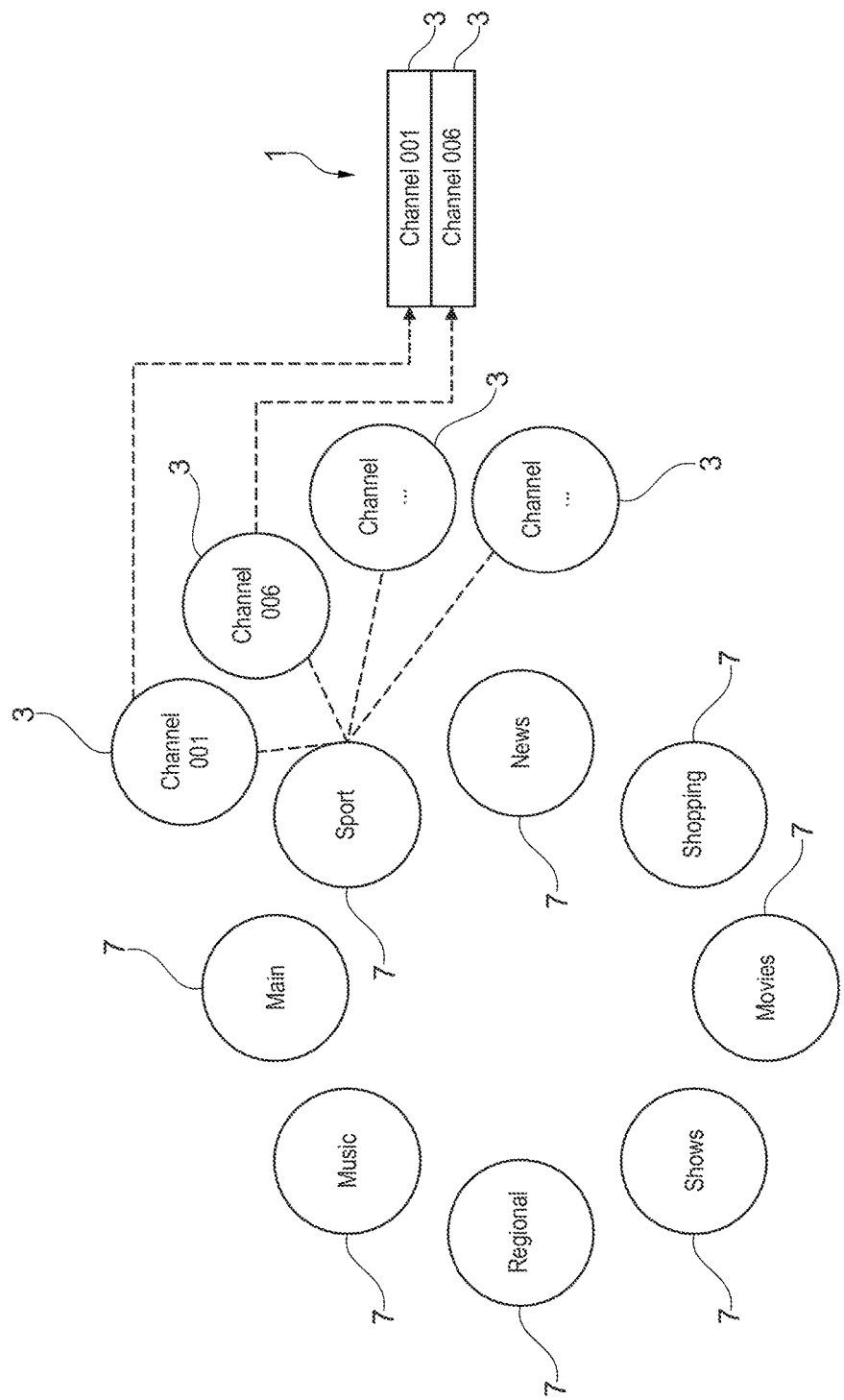
FIGS. 3-5 show a plurality of channel groups, media channels and a media channel access list according to embodiments of the present invention.

In order to assemble the media channel access list 1, the user first performs one user input to select the channel group "Sport" 7 shown in FIG. 2. The channel group "Sport" 7 may unfold automatically when selected, without any further user input, and the channels belonging to this group may be displayed as shown in FIG. 3. Then, "Channel 001" 3 of channel group "Sport" 7 is preselected because it is the first media channel 3 of the corresponding channel group 7, and the user has to perform one user input on his operation device to assign "Channel 001" 3 to the media channel access list 1. Accumulating all performed user inputs, a total number of two user inputs have been performed for assigning "Channel 001" 3, to the media channel access list 1.

Next, the user wishes to assign "Channel 006" 3 to the media channel access list 1. Since "Channel 006" 3 is also a sports-related media channel 3 in this example, the user has to perform only one user input on his operation device to reach and select "Channel 006" 3 in the already selected and unfolded channel group "Sport" 7. Then, one additional user input is required to assign "Channel 006" 3 to the media channel access list 1. Accumulating all performed user inputs, a total number of four user inputs have been performed so far for assigning "Channel 001" 3 and "Channel 006" 3 to the media channel access list 1.

Figure 4:
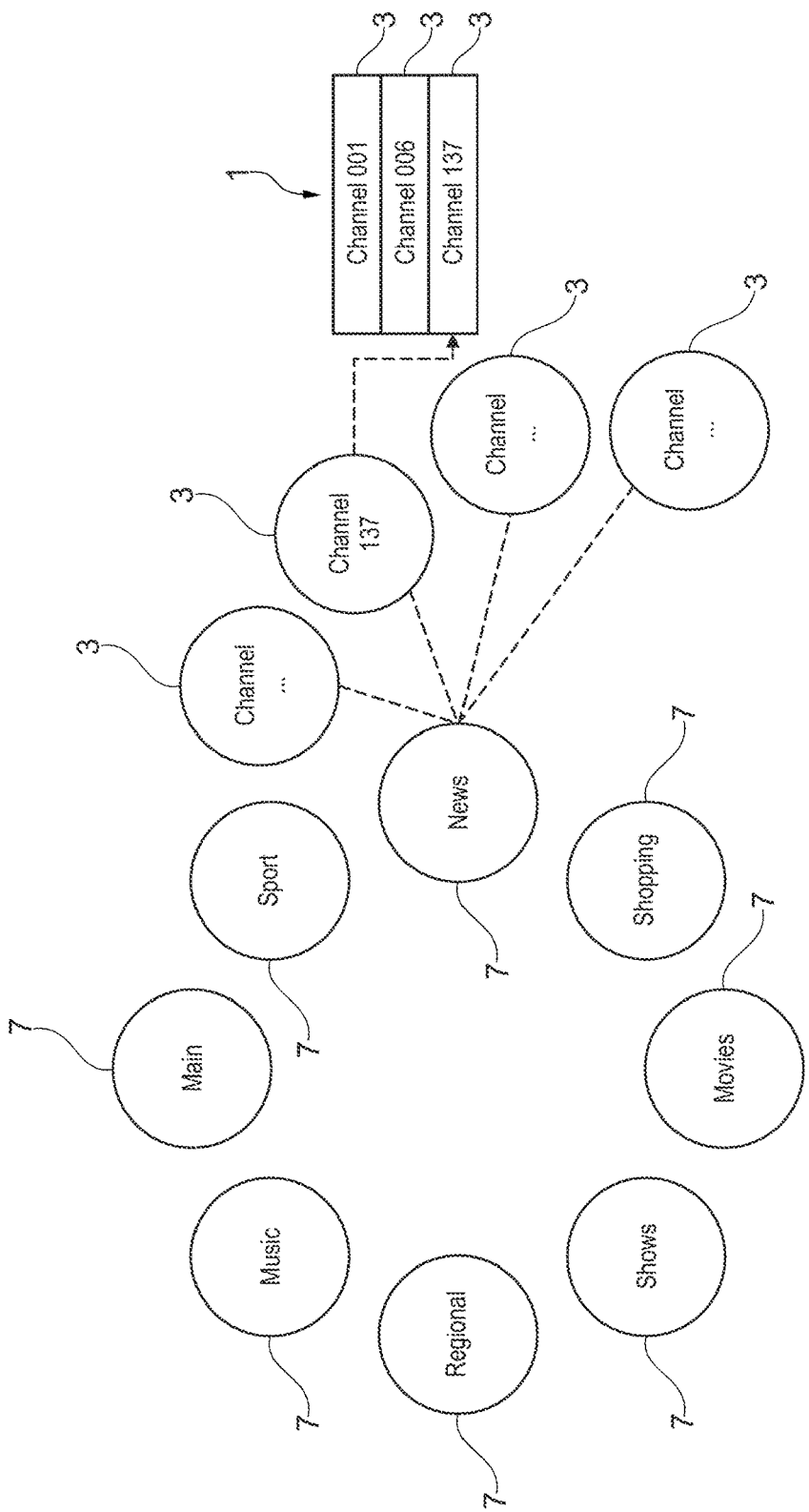

Referring now to FIG. 4, the user then assigns "Channel 137" 3, which is a news media channel 3, to the media channel access list 1, by performing one user input to get back to the channel group 7 selection. Then, one user input is required to switch from the still selected channel group "Sport" 7 to the channel group "News" 7. The channel group "News" 7 may again unfold automatically when selected, and the first "Channel . . . " 3 of channel group "Sport" 7 may be preselected because it is the first media channel 3 of the corresponding channel group 7. Then, the user has to perform one user input on his operation device to reach and select "Channel 137" 3. Afterwards, one user input is required to assign "Channel 137" 3 to the media channel access list 1. Accumulating all performed user inputs, a total number of eight user inputs have been performed so far.

Figure 5:
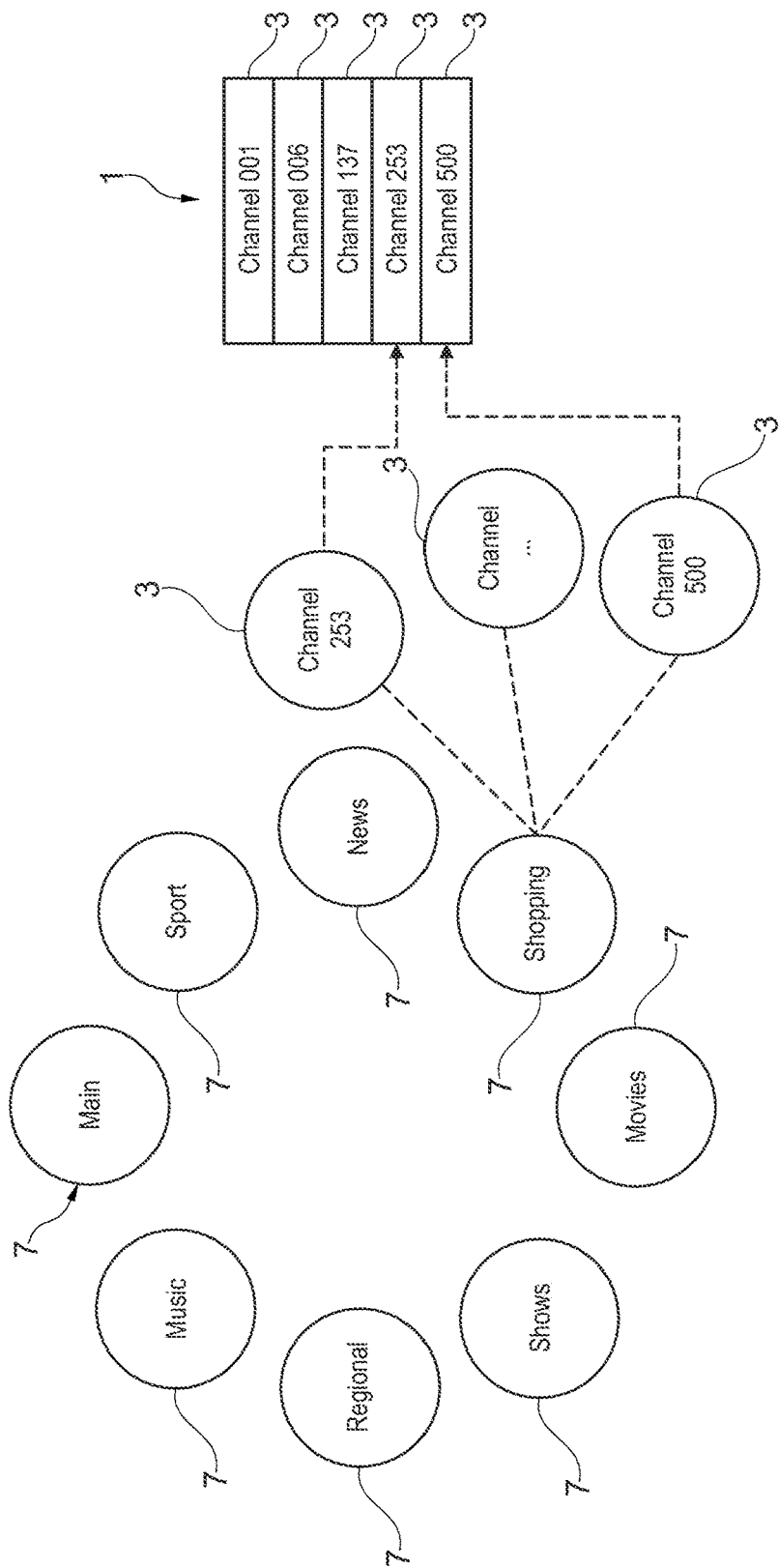

Referring now to FIG. 5, the user assigns "Channel 253" 3, which is a shopping media channel 3, to the media channel access list 1, by performing one user input to get back to the channel group 7 selection, one further user input to switch from the still selected channel group "News" 7 to the channel group "Shopping" 7. Then, "Channel 253" 3 of channel group "Shopping" 7 may be preselected because it is the first media channel 3 of the corresponding channel group 7, so that one additional user input is required to assign "Channel 253" 3 to the media channel access list 1. In total eleven user inputs have been performed so far.

Still referring to FIG. 5, after having assigned "Channel 253" 3 to the media channel access list 1, the user finally has to add "Channel 500" 3 to the media channel access list 1. Since "Channel 500" 3 is also a shopping-related media channel 3 in this example, the user has to perform only two user inputs on his operation device to reach and select "Channel 500" 3 in the already selected and unfolded channel group "Shopping" 7 because only one media channel 3 exists between the previously assigned "Channel 253" 3 and "Channel 500" 3. Then, one additional user input is required to assign "Channel 006" 3 to the media channel access list 1.

Summing up the above, using an embodiment of the invention a total number of only 14 user inputs have been performed for assigning "Channel 001", "Channel 006", "Channel 137", "Channel 253", and "Channel 500" to the media channel access list 1.

As can be seen, both the above-described prior art approach and the exemplarily described approach according to embodiments of the present invention result in the same media channel access list 1, comprising the exemplary five media channels. However, with the prior art approach, 897 user inputs have been performed, whereas only 14 user inputs are required by using the embodiment of the present invention.

The above discussed issues may mainly apply to devices that are operated by a remote control or the like. However, even in respect to devices that are operated by touchscreens, less user inputs may be required compared to the prior art solutions since unnecessary user input like scrolling and the like may be reduced or even avoided.

Figure 6:
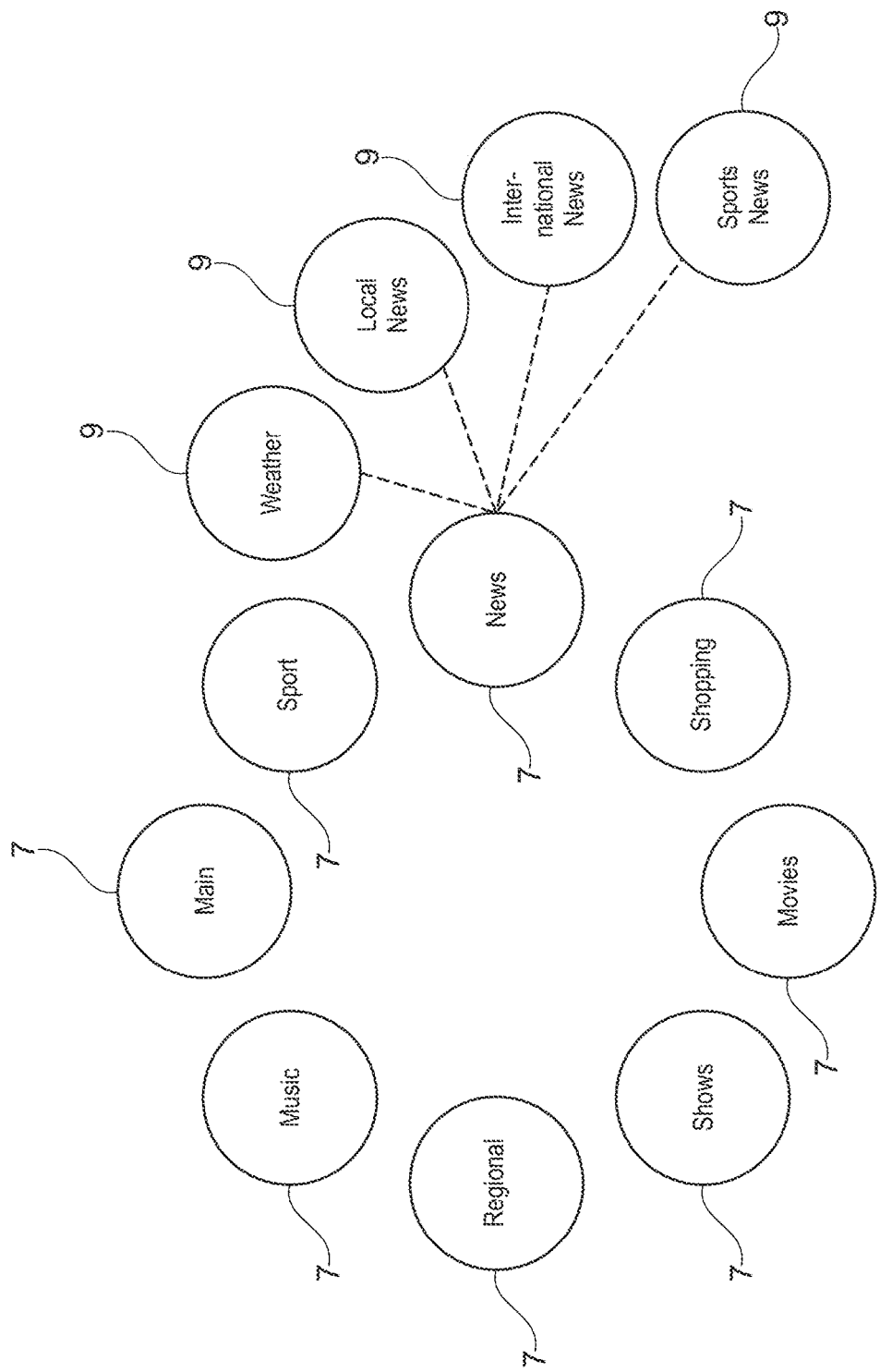
FIG. 6 shows a plurality of channel groups and subgroups according to embodiments of the present invention.

Referring to FIG. 6, the number of required user inputs may be even further reduced by assigning the media channels 3 to subgroups 9, wherein the subgroups 9 may be assigned to the channel groups 7. Therefore a further access layer is generated. Said access layer may further reduce the number of user inputs required for reaching and selecting a media channel 3 for assigning it to the media channels access list 1.

Furthermore, media channels 3 can be assigned to one or more channel groups 7 and/or to one or more subgroups 9 at the same time. This may further reduce the number of required user inputs to reach and select the desired media channel 3.

According to embodiments of the present invention, all media channels 3 of a channel group 7 may be added to the media channel access list 1 at once. This may for example be done by selecting a group according to the above description. Then, a user may perform a special user input, like a long key press or a specific gestures on a touchscreen or any other user input that may be distinguished from other user inputs. Such a user input may assign all media channels 3 of a channel group 7 to the media channel access list 1. The same also applies to subgroups 9. However, in addition or alternatively, a further "add all" button 21 may be shown in the visual representation of a channel group 7 and/or subgroup 9. When said "add all" button 21 is pressed, the same or similar actions as described with respect to the aforementioned special user input may be performed. Apparently, this further advantageously reduces the number of user inputs while generating or modifying the media channel access list 1.

Alternatively, a user may select more than one media channels 3 of a channel group 7 with a further specific user input that may be distinguished from the other user inputs. This user input only selects a media channel 3 and does not assign it to the media channel access list 1. Then, the user may select other media channels 3 of the respective channel group 7. After all desired media channels 3 are selected, the user may perform a user input that may also be distinguished from all other discussed user inputs. This user input assigns all selected media channels 3 to the media channel access list 1. This also applies to subgroups 9. As can be seen, this further advantageously reduces the number of user inputs while generating or modifying the media channel access list 1.

In addition, the order in which a user has selected the media channels 3 may be maintained when assigning them to the media channel access list 1. Therefore, the selected media channels 3 may be assigned to the next available position in the media channel access list 1, e.g. at the end while maintaining the order defined by their selection. To provide a better usability, after selecting a media channel 3, a corresponding number, indicating the order of the selection of the media channels 3 may be displayed in the respective visual representation of the media channel 3.

Figure 7:
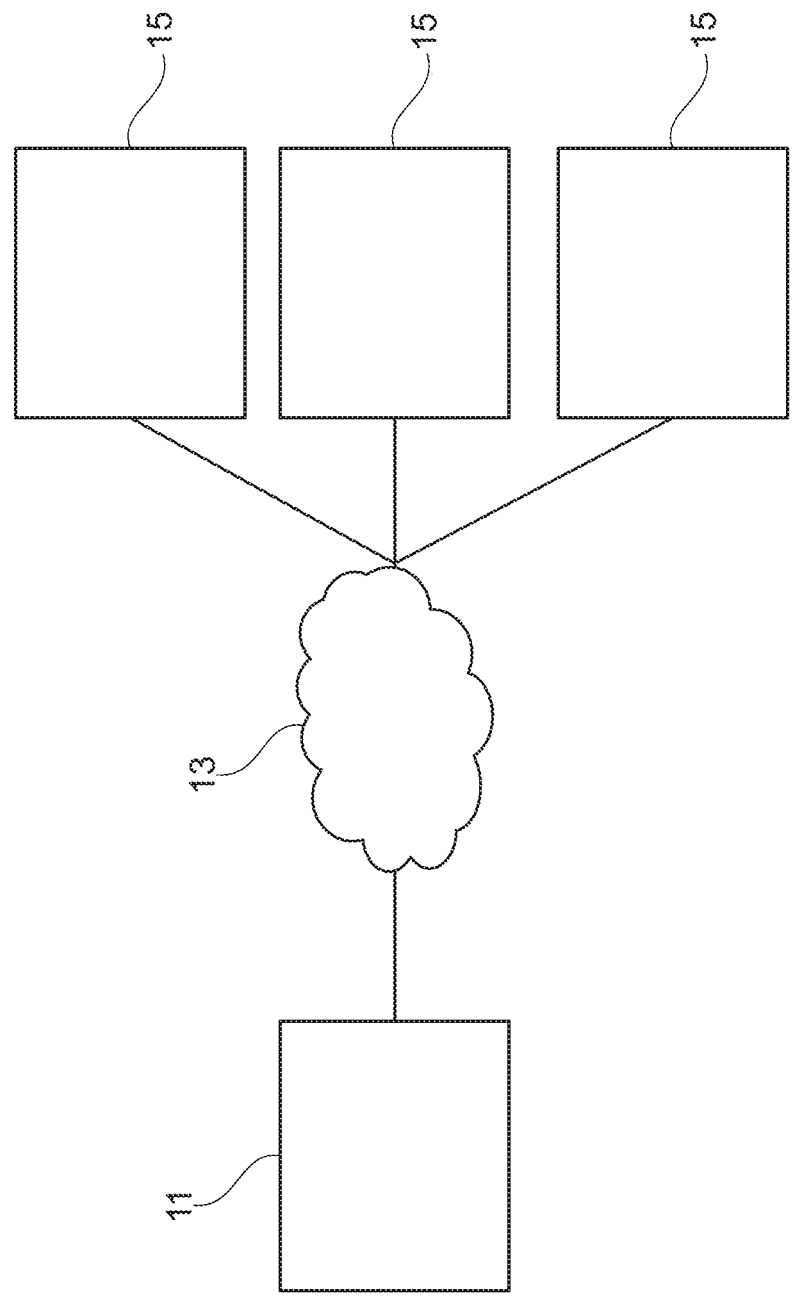
FIG. 7 shows a system, a network, and remote devices according to embodiments of the present invention.

Turning now to FIG. 7, an exemplary setup comprising a system 11 according to the invention is shown. The system 11 may comprise a reception device and/or operation devices like television devices, computer displays, settopbox devices, streaming client devices, tablet devices, smartphone devices, computer devices, remote controls, game controllers, joysticks, gesture recognition systems, voice recognition systems or the like or any combination thereof. Particularly, with respect to display-based devices, the embodiments of the present invention are preferably operable on displays having a size of at least 3.5" (8.89 cm), preferably of at least 5.5" (13.94 cm). The system 11 may be connected to one or more remote devices 15. The remote device 15 may comprise a server, a computer, or any other central instance which may be able to receive, to store, to process and/or to transmit data.

In some embodiments of the present invention, media channels 3, channel groups 7, and/or subgroups 9 may be preselected. The preselection may be based on priorities. Priorities may be determined by a remote device 15. When a user selects a specific media channel 3, a channel group 7, and/or a subgroup 9, the selection may be transmitted to a remote device 15. The remote device 15 may gather and store the selection of media channels 3, a channel groups 7, and/or a subgroups 9 of a plurality of users. Then, for example according to how often specific media channels 3, a channel groups 7, and/or a subgroups 9 are selected, the remote device 15 may calculate one or more priorities. The priorities may be transmitted to the reception device over a network 13 like the Internet or any other communication network. Communication may be based on standardized protocols or the like. Based on the priority/priorities, the reception device may know which media channels 3, which channel groups 7, and/or which subgroups 9 are selected most likely by a user and therefore may preselect it. This may further reduce the number of required user inputs to reach and select a desired media channel 3. However, it is noted, the priorities may be determined according to any other suitable criteria, e.g., by relevance, by the time how long specific media channels 3 are consumed etc.

According to embodiments of the present invention, a specific channel group 7 may be provided. This channel group 7 may be called "favorites" and may hold the most often consumed media channels 3. The channel group 7 may be automatically generated by the remote device 15, for example based on the above discussed priorities. The remote device 15 may transmit the channel group 7 to the reception device or may just update it. Such a channel group 7 may allow a user to assign the most often consumed media channels 3 to the media channel access list 1 at once, or at least a selection of media channels 3 of said channel group 7 or of any subgroup 9. This further reduces the number or required user inputs for generating and/or modifying a media channel access list 1.

According to embodiments of the present invention, when new media channels 3 are created, these media channels 3 may be stored in a specific channel group 7. This channel group 7 may be called "new channels" or the like. Therefore, when a user may modify the media channel access list 1, he may be able to browse the new media channels 3 with a low number of user inputs because the new media channels 3 are already bundled within one channel group 7. Moreover, the channel group 7 may be further hold subgroups 9 to which the new media channel 3 are assigned to.

Referring now to FIGS. 8-11, an exemplary implementation of a user interface according to embodiments of the present invention is shown. As will be further explained below, each channel group 7, subgroup 9 and/or media channel 3 is preferably represented by a graphical object on a display screen, such as the screen of a reception device or the touchscreen of a tablet computer or the like. Even more preferred is the representation by a graphical object with circular shape. In an initial state, as exemplarily shown in FIG. 8, the graphical objects may be essentially evenly distributed on the screen, which allows an efficient access to the objects from all borders of e.g. a tablet computer or other touch-sensitive device.

Figure 8:
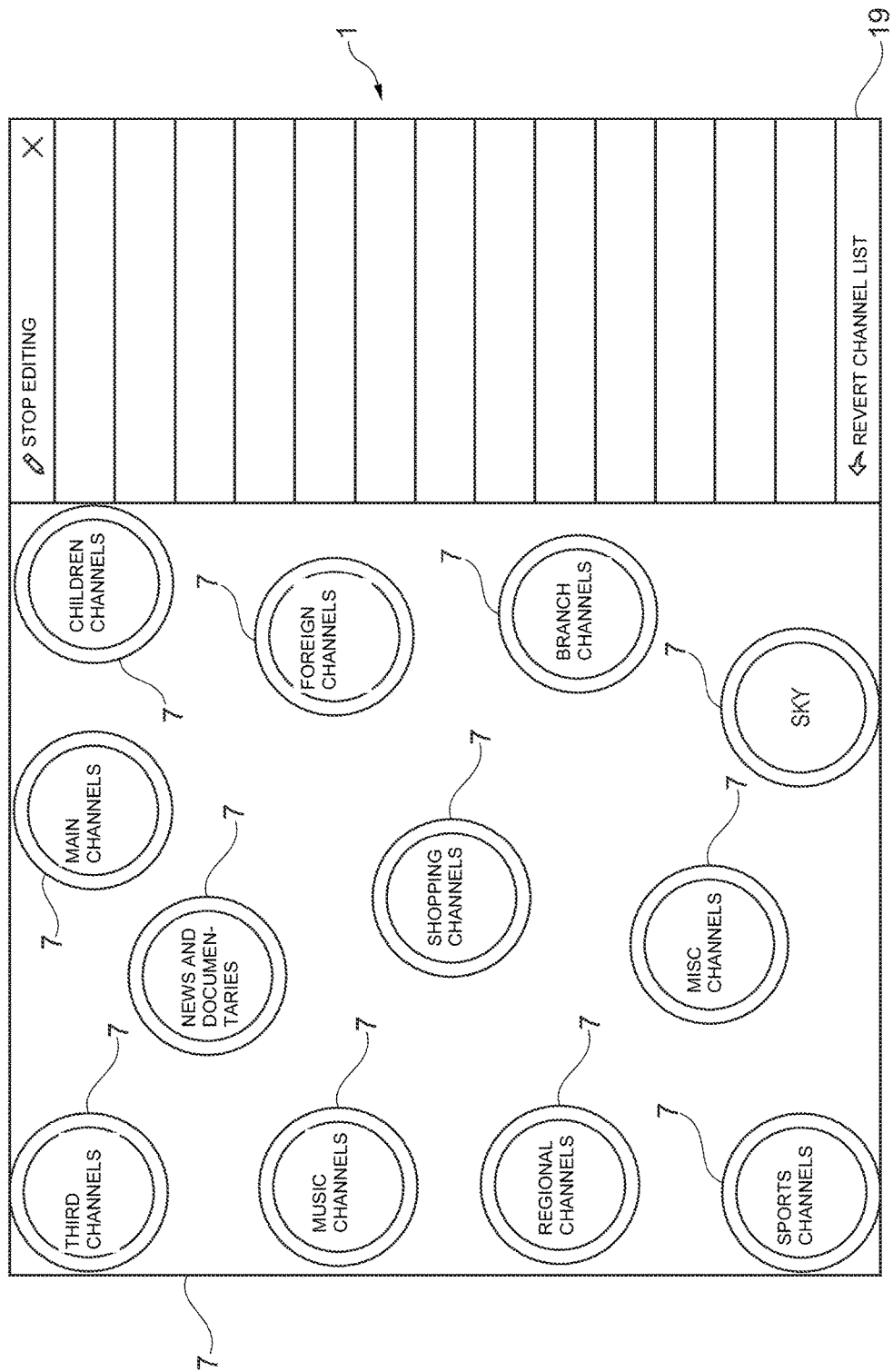
FIGS. 8-11 show screenshots of an exemplary graphical user interface according to embodiments of the present invention.

In more detail, FIG. 8 shows an exemplarily layout of the plurality of channel groups 7. Each single channel group 7 may be represented by a circle and may be called a bouquet, bullet, or the like. However, any other geometrical shape may also be suitable. In addition, FIG. 8 shows an empty media channel access list 1 in edit mode. The generation or modification of the media channel access list 1 may be initiated by pressing an edit button which may be displayed when, for example, the channel groups 7 are browsed. However, such an edit button may be shown in every view. An existing media channel access list 1 may be reset by pressing reset button 19. An existing media channel access list may either be pre-compiled on the reception device or may be retrieved from remote device 15. In addition, one or more buttons may exist for removing one or more media channels 3 from the media channel access list 1. Furthermore, this may also be done by dragging and dropping one or more media channels 3 of the media channel access list 1 to specific region of a display, e.g. an empty area.

Figure 9:
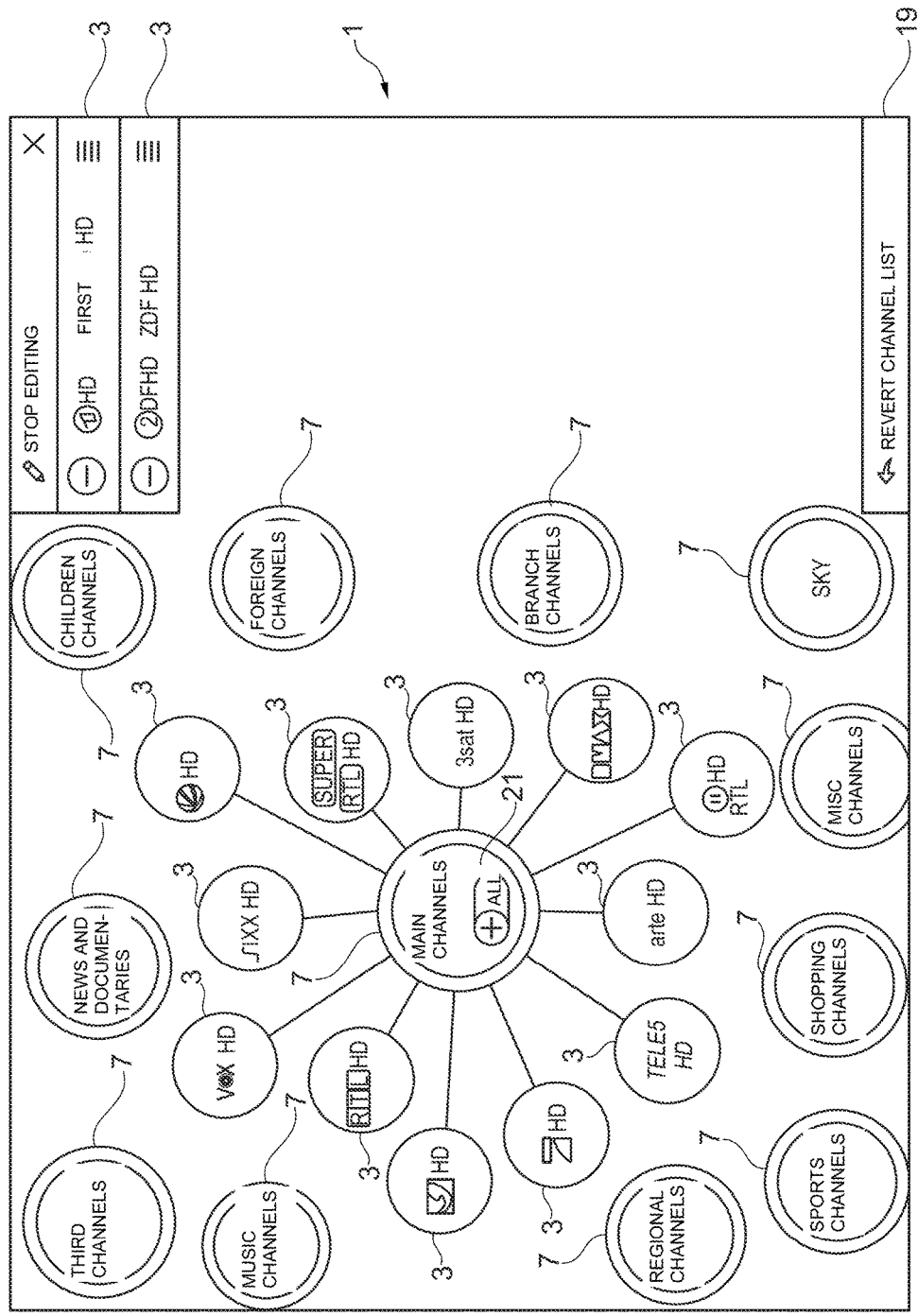

FIG. 9 exemplarily shows an unfolded channel group 7 in the center of the display. The unfolded channel group 7 is approximately placed in the center surrounded by media channels 3 which are assigned to said channel group 7. The media channels 3 are shown in terms of circles. However, any other geometrical shape may be possible. In addition, a media channel access list 1 is shown that already comprises two media channels 3. Such an arrangement of channel groups 7 and surrounding media channels 3 may allow a user to browse through the channel groups 7 more efficiently, e.g. with a minimum of required movement of the user's finger(s) above a touchscreen. In addition, such an arrangement also optimizes the usage of the limited screen space available on devices such as tablet computers or smartphones.

To further improve the usability, media channels 3 that have already been assigned to the media channel access list 1, may be hidden from the respective channel groups 7 and/or subgroups 9. This may provide an improved overview. In addition, when media channels 3 are removed from the media channel access list 1, they may be shown again in the respective channel group 7 and/or subgroup 9 such that they may be re-assigned again later-on.

In more detail, when a channel group 7 is selected, it may optionally move approximately to the center of the user interface. Then, the assigned media channels 3 may unfold and may be arranged around the selected channel group 7. When another channel group 7 is selected, this other channel group may optionally also move to the center while the previously selected channel group 7 may move back to its original position or may move to any other position outside the center. Before moving outside the center, the previously selected channel group 7 may fold again such that the corresponding media channels 3 may disappear. The process of selecting a channel group 7, optionally moving it approximately to the center, folding and unfolding, selecting a new channel group 7 may be visualized in terms of animations. However, the described objects may also just appear at the desired position, without any animation.

Figure 10:
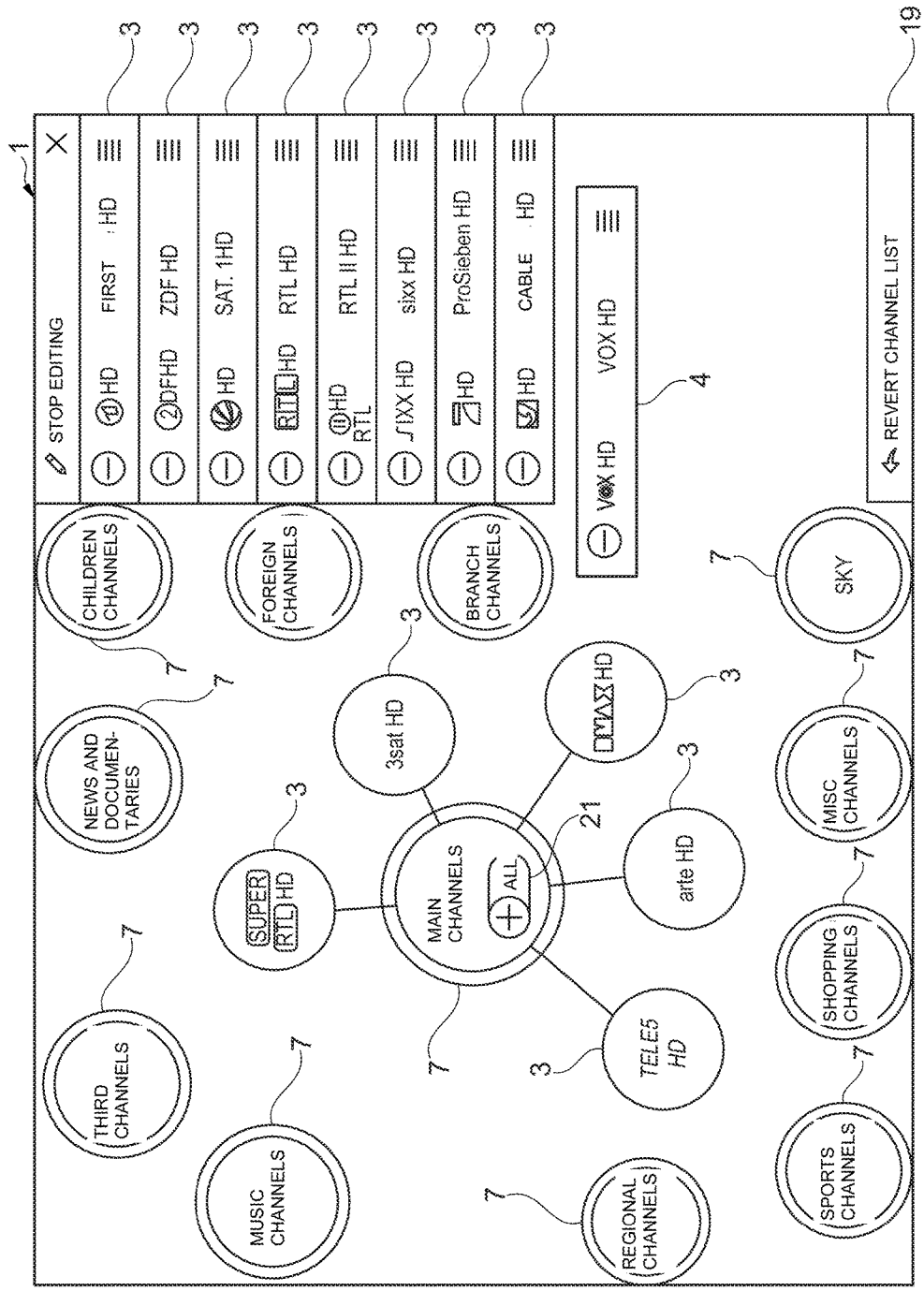

FIG. 10 exemplarily shows a media channel while being moved 4 from a channel group 7 to the end of the media channel access list 1. Moving can for example be done by means of a touchscreen or the like. In more detail, moving may be done by dragging and dropping a media channel 3 to the media channel access list 1. However, a media channel 3 may be moved to any other position within the media channel access list 1 to position it there. In addition, a media channel 3 which has already be assigned to the media channel access list 1 may be moved to another position within the media channel access list 1 by, for example, dragging and dropping it to said position.

Figure 11:
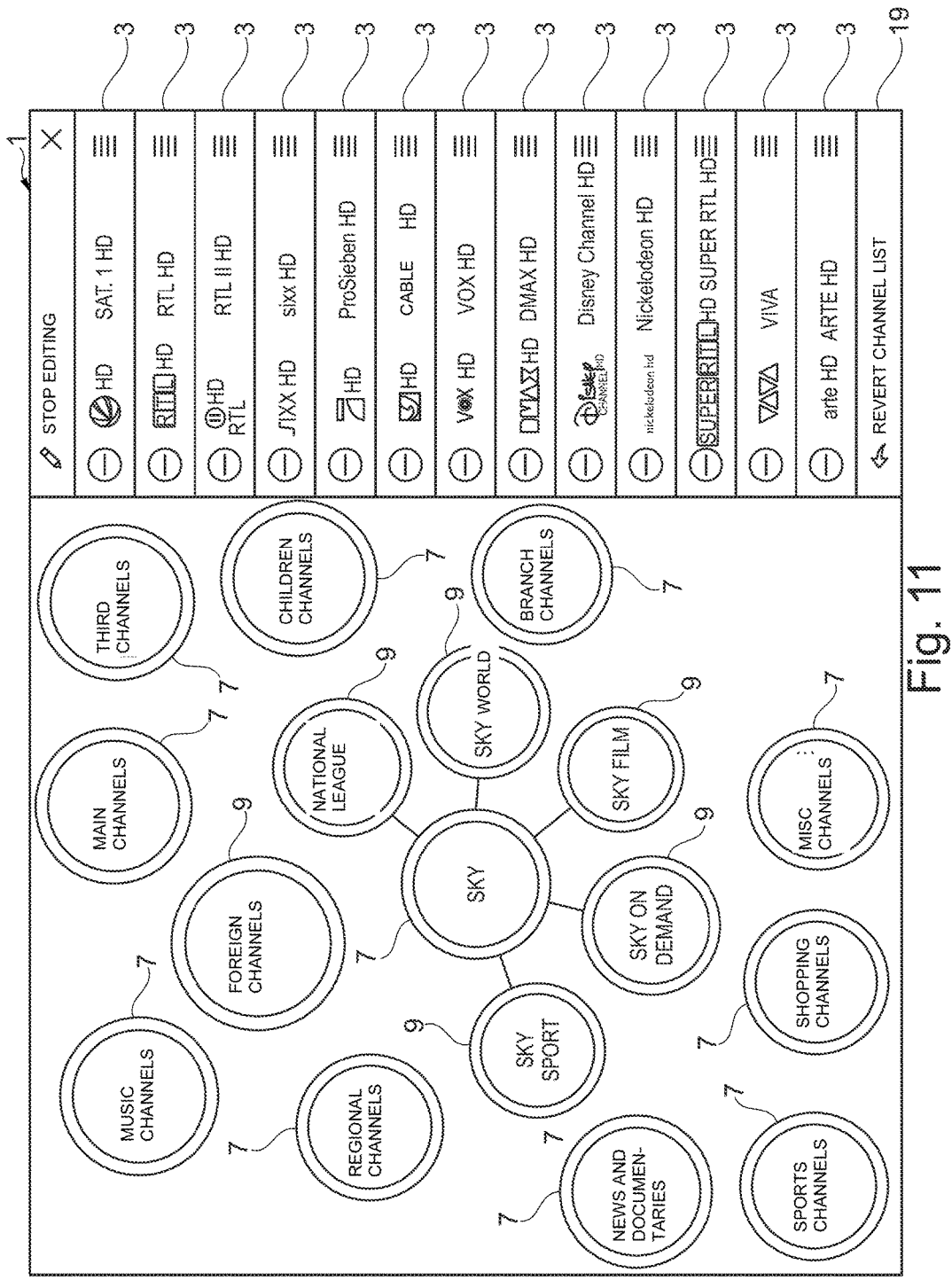

FIG. 11 exemplarily shows a media channel access list 1 comprising several media channels 3. In addition, approximately at the center, a selected and unfolded channel group 7 is shown. The channel group comprises several subgroups 9 which surround the channel group 7. The subgroups 9 are shown in terms of circles which may also be called bouquets, bullets or the like. However, any other geometrical shape may be possible. Displaying these subgroups 9 may follow the same or similar principles as described above with respect to FIG. 9 regarding the displaying of the media channels 3 of a channel group 7.

Displaying channel groups 7, subgroups 9 and/or media channels 3 in the above described way may enable a user to efficiently assign media channels 3 to a media channel access list. Particularly, displaying channel groups 7, subgroups 9, and/or media channels 3 in the above described way may further improve durability of an operation device, of the display itself, and power consumption. In more detail, such an advantageous displaying of media channels 3, which are necessary for operating a reception device properly, may significantly improve the operability of corresponding reception devices and may lead to the above describes technical advantages with respect to increased durability of both remote and reception devices. In addition, this may also lead to the reduced power consumption of remote devices. This is because the above described displaying may enable a user to assign media channels 3 to a media channels access list 1 with a reduced number of user inputs compared to the prior art solutions. Irrespective of "what" is displayed in the graphical objects explained above, but rather based on "how" they are displayed, the correct technical controlling of the reception device is achieved.

The displaying of the channel groups 7, the media channels 3 and the subgroups 9 described with respect to FIGS. 8-11 may be combined with any method step described above. The same applies to the above described system.

Particularly referring to modifying a media channel access list 1, the media channel access list 1 may have been retrieved, for example, from a remote device 15. In this respect, the reception device may have announced itself to the remote device 15. Thus, the remote device 15 may be able to determine the type of the reception device, e.g., whether it is a television device or a radio device. Then, the remote device 15 may transmit a specific media channel access list 1 as starting point for modifying it to the reception deice. A specific media channel access list 1 may only comprise media channels 3 that are suitable for the reception device. When, for example, the reception device is a radio device, the transmitted media channel access 1 list may only comprise radio-related media channels 3.

Figure 12:
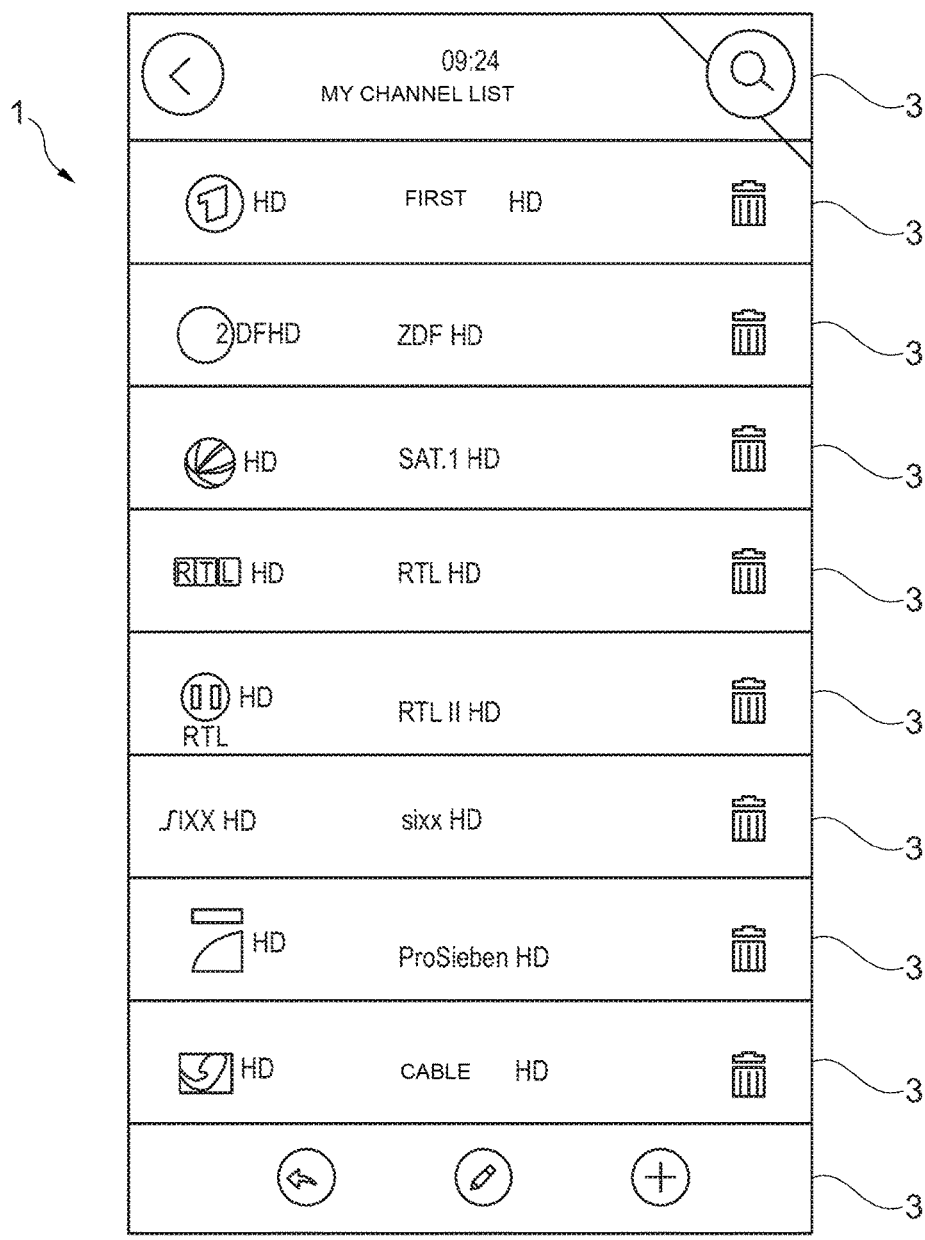
FIGS. 12-14 show screenshots of an exemplary graphical user interface for displays with a small screen size according to embodiments of the present invention.
Figure 13:
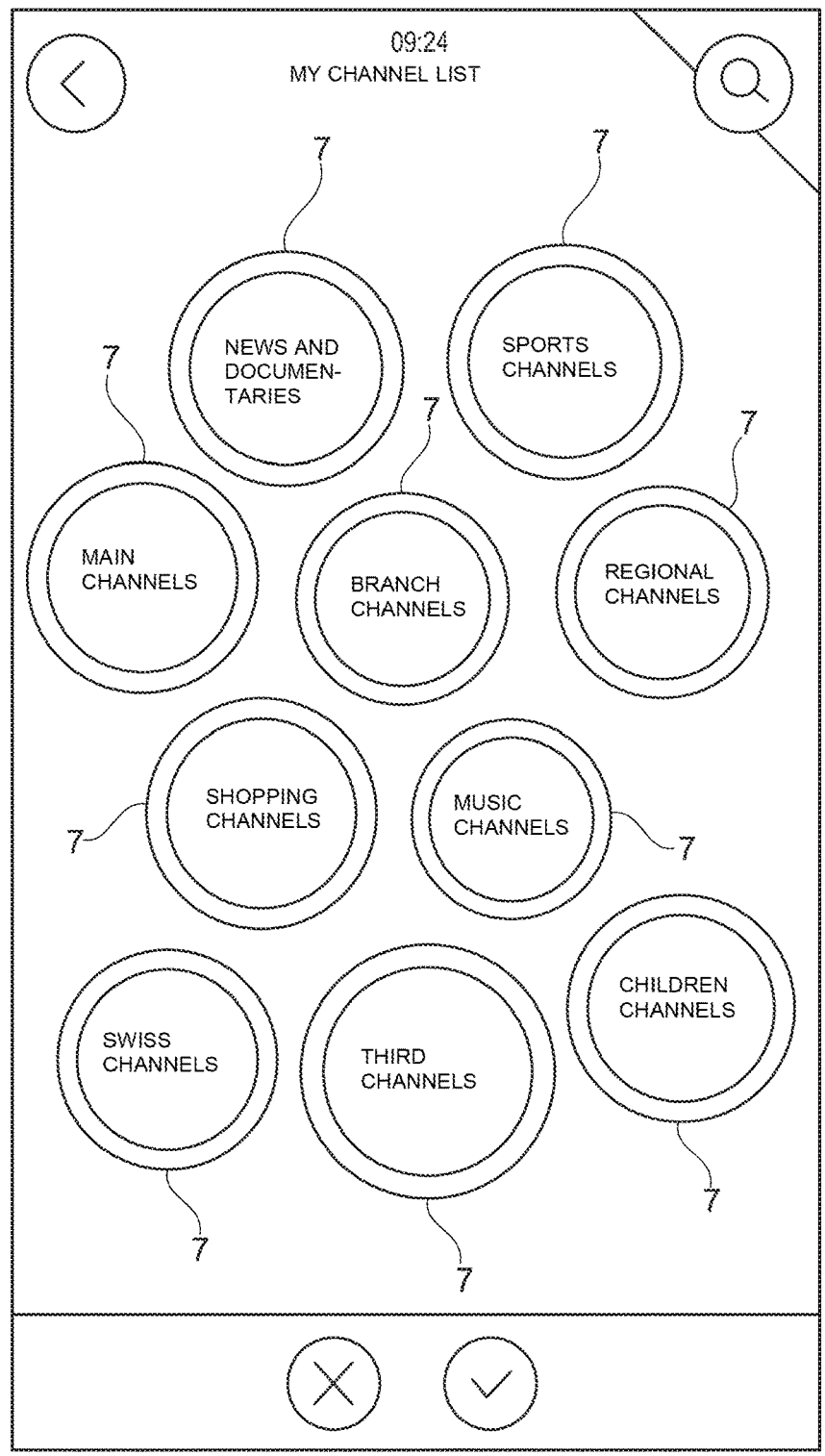
Figure 14:
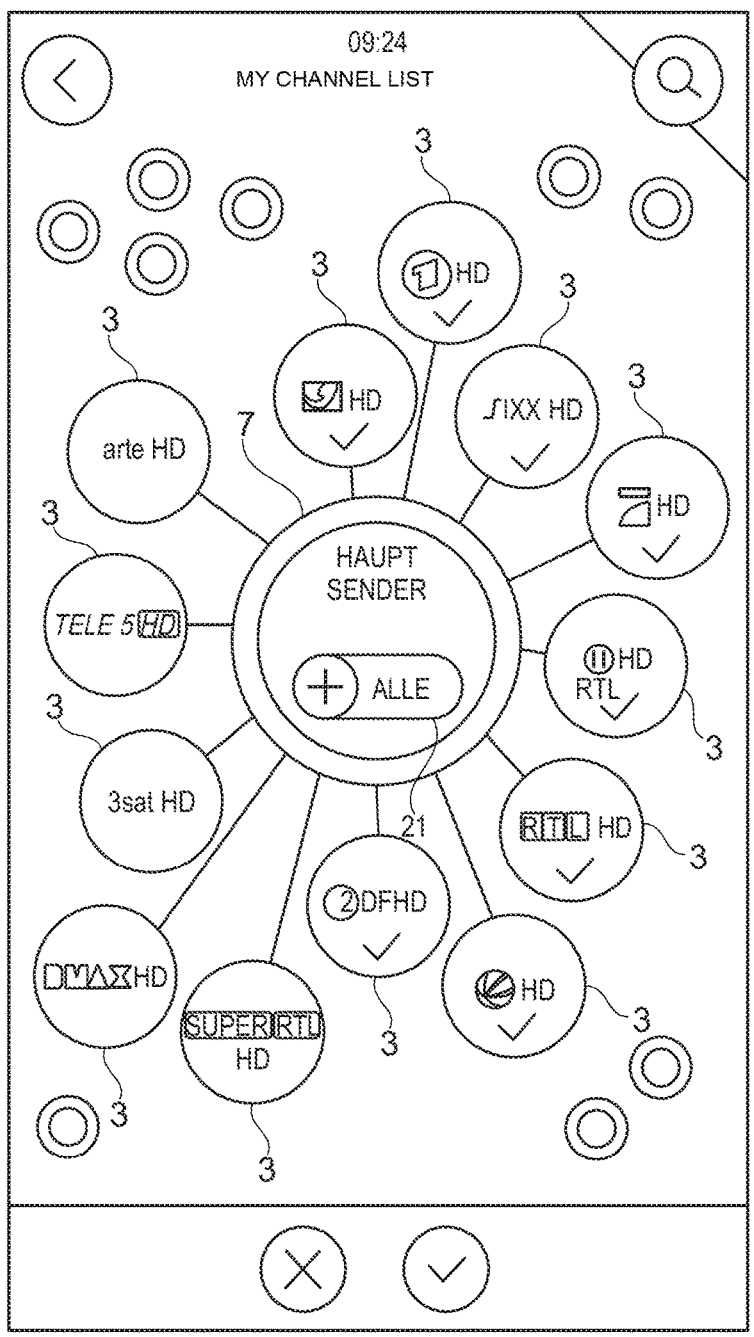

FIG. 12 shows a media channel access list 1 being in an edit mode. In particular, the media channel access list 1 of FIG. 12 may be suitable for devices with a small screen size. The edit mode may enable a user to remove media channels 3 from the list. In addition, the displayed name of a media channels 3 may be changed in said edit mode. FIG. 13 shows a plurality of channel groups 7. In particular, the shown arrangement may be suitable for devices with a small display size. FIG. 14 shows an unfolded channel group 7 and corresponding media channels 3. In particular, the shown arrangement may be suitable for devices with a small display size.

In addition, the herein presented arrangements of media channels 3, channel groups 7, subgroups 9, and/or of the media channel access list 1 itself may be designed such that scrolling or any user action for "moving" the content of the display is avoided. This may further improve the usability of the present invention. All herein described method steps may be implemented in terms of a computer program.

What is claimed is:

1. A method for generating and/or modifying a media channel access list by a system comprising a memory and a display device, the method comprising:
   storing, in the memory, a channel list of a plurality of selectively assignable media channels;
   displaying, on the display device, a plurality of channel groups associated with the plurality of selectively assignable media channels;
   selecting one of the plurality of channel groups in response to user input; and
   selectively assigning at least one of the plurality of selectively assignable media channels of the selected channel group to the media channel access list in response to a first single user input, wherein the media channel access list is useable to select at least one of the assigned media channels for presentation on the display device,
   wherein the plurality of selectively assignable media channels of the selected channel group and the plurality of channel groups are simultaneously displayed by the display device, and wherein, while the plurality of selectively assignable media channels of the selected channel group and the plurality of channel groups are simultaneously displayed, a second one of the plurality of channels groups may be selected in response to a second single user input.

2. The method of claim 1, wherein said selectively assigning at least one of the plurality of selectively assignable media channels comprises assigning all of the plurality of selectively assignable media channels of the selected channel group to the media channel access list in response to the first single user input.

3. The method of claim 1, wherein said selectively assigning at least one of the plurality of selectively assignable media channels comprises assigning the at least one of the plurality of selectively assignable media channels of the selected channel group to the end of the media channel access list or to a specified position in the media channel access list.

4. The method of claim 1, wherein at least one of said selecting one of the plurality of channel groups or said selectively assigning at least one of the plurality of selectively assignable media channels is performed in response to user input on a remote control, a touchscreen, a voice recognition system and/or a gesture recognition system.

5. The method of claim 1, wherein each of the plurality of selectively assignable media channels is associated with at least one of the plurality of channel groups.

6. The method of claim 1, wherein said selecting one of the plurality of channel groups comprises preselecting one of the plurality of channel groups and/or preselecting at least one of the plurality of selectively assignable media channels of the selected channel group.

7. The method of claim 6, wherein the preselecting is based on one or more priorities provided to the system by a remote device over a network.

8. The method of claim 1, wherein at least one of said selection of one of the plurality of channel groups and said selective assignment of at least one of the selectively assignable media channels is transmitted to a remote device over a network.

9. The method of claim 1, further comprising receiving and/or updating the plurality of selectively assignable media channels, the plurality of channel groups and/or the association of the plurality of selectively assignable media channels with at least one of the plurality of channel groups from a remote device over a network.

10. The method of claim 1, wherein at least one of the plurality of channel groups comprises one or more subgroups and wherein at least some of the plurality of selectively assignable media channels are assigned to at least one of the plurality of channel groups and to one or more respective subgroups.

11. The method of claim 1, wherein the media channel access list is persistent.

12. The method of claim 1, wherein the system is external to a media channel reception device.

13. A non-transitory computer readable memory medium comprising program instructions which are executable to generate and/or modify a media channel access list by:
   (a) storing, in a memory, a channel list of a plurality of selectively assignable media channels;
   (b) displaying, on a display device, a plurality of channel groups associated with the plurality of selectively assignable media channels;
   (c) selecting one of the plurality of channel groups in response to user input; and
   (d) selectively assigning at least one of the plurality of selectively assignable media channels of the selected channel group to the media channel access list in response to a first single user input, wherein the media channel access list is useable to select at least one of the assigned media channels for presentation on the display device,
   wherein the plurality of selectively assignable media channels of the selected channel group and the plurality of channel groups are simultaneously displayed, and wherein, while the plurality of selectively assignable media channels of the selected channel group and the plurality of channel groups are simultaneously displayed, a second one of the plurality of channels groups may be selected in response to a second single user input.

14. The memory medium of claim 13, wherein (d) comprises assigning all of the plurality of selectively assignable media channels of the selected channel group to the media channel access list in response to the first single user input.

15. The memory medium of claim 13, wherein (d) comprises assigning the at least one of the plurality of selectively assignable media channels of the selected channel group to the end of the media channel access list or to a specified position in the media channel access list.

16. The memory medium of claim 13, wherein at least one of the plurality of channel groups comprises one or more subgroups and wherein at least some of the plurality of selectively assignable media channels are assigned to at least one of the plurality of channel groups and to one or more respective subgroups.

17. A system for generating and/or modifying a media channel access list, wherein the system comprises:
   a processor;
   a memory coupled to the processor, wherein the memory stores a channel list of a plurality of selectively assignable media channels;

a display device which displays a plurality of channel groups associated with the plurality of selectively assignable media channels;

a user input device configured to select one of the plurality of channel groups in response to user input;

wherein the processor is configured to selectively assign at least one of the plurality of selectively assignable media channels of the selected channel group to the media channel access list in response to a first single user input, wherein the media channel access list is useable to select at least one of the assigned media channels for presentation on the display device; and wherein the display device is configured to simultaneously display the plurality of selectively assignable media channels of the selected channel group and the plurality of channel groups, and wherein, while the plurality of selectively assignable media channels of the selected channel group and the plurality of channel groups are simultaneously displayed, a second one of the plurality of channels groups may be selected in response to a second single user input.

18. The system of claim 17, wherein the system comprises at least one of the following devices:

a television device
a settop-box device
a streaming client device
a tablet device
a smartphone device
a computer device
a remote control
a gesture recognition system
a voice recognition system, and
a radio device.

19. The system of claim 17, wherein the processor is further configured to assign all of the plurality of selectively assignable media channels of the selected channel group to the media channel access list in response to the first single user input.

20. The system of claim 17, wherein at least one of the plurality of channel groups comprises one or more subgroups and wherein at least some of the plurality of selectively assignable media channels are assigned to at least one of the plurality of channel groups and to one or more respective subgroups.

* * * * *